Feb. 11, 1958  G. M. WALTON ET AL  2,822,926
CROSS WASHER FOR HOLLOW FILTER LEAVES
Filed Feb. 24, 1953  2 Sheets-Sheet 2

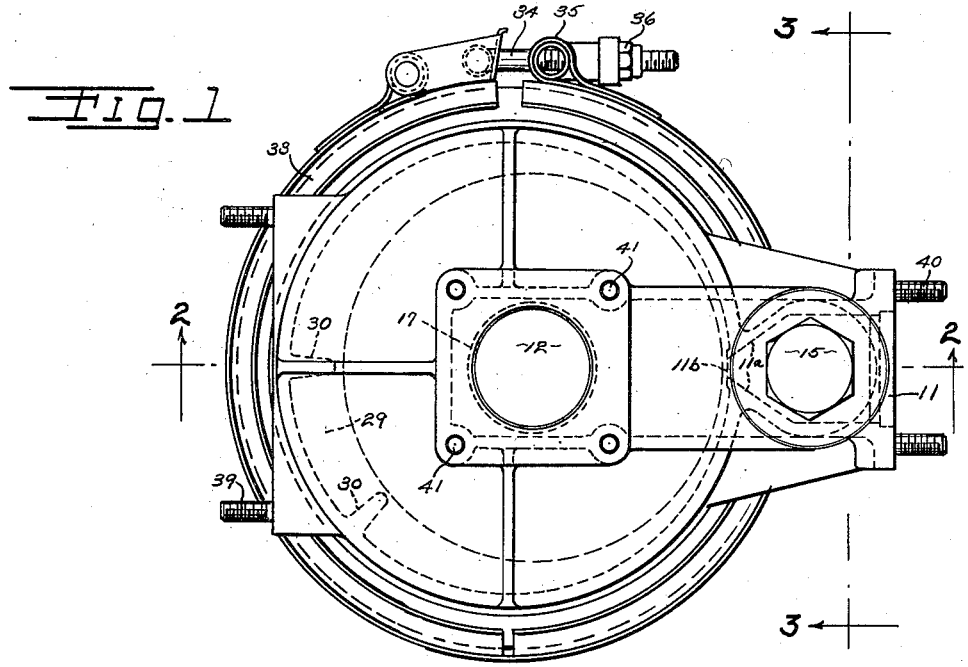
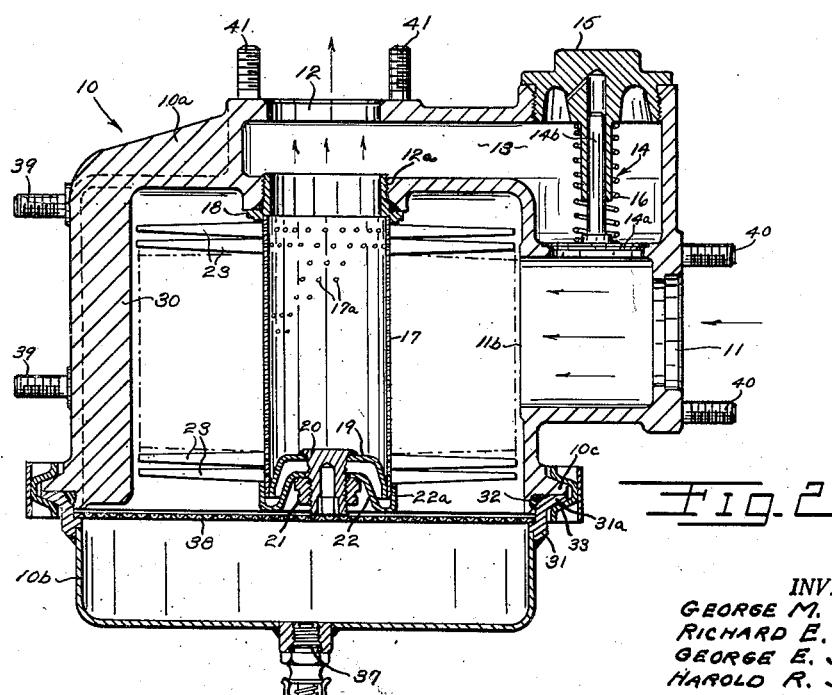

INVENTORS,
GEORGE M. WALTON
RICHARD E. BROWN
GEORGE E. SLATER
HAROLD R. SOBECK
Hyde, Meyer, Baldwin & Doran
ATTORNEYS

United States Patent Office 2,822,926
Patented Feb. 11, 1958

2,822,926

CROSS WASHER FOR HOLLOW FILTER LEAVES

George M. Walton, Richard E. Brown, George E. Slater, and Harold R. Sobeck, Cleveland, Ohio, assignors to Air-Maze Corporation, Bedford Heights, Ohio, a corporation of Delaware Application February 24, 1953, Serial No. 338,232

4 Claims. (Cl. 210—305)

This invention relates to improvements in a cross washer for hollow filter leaves, and more particularly in a filter composed of a plurality of hollow generally flat and parallel filter leaves mounted on a central tube and wherein the incoming jet of dirty liquid passes through a nozzle so as to give it sufficient velocity to maintain a number of the filter leaves clean for a much longer period of time than normal.

One of the objects of the present invention is to provide a liquid filter, especially one suitable for filtering liquids of the character of kerosene, gasoline or naphtha and wherein certain novel features of the invention maintain the filter leaves clean for a longer period of time than would normally be true without the use of our invention.

More specifically, our invention aims to provide a liquid filter comprising a housing having a dirty liquid inlet at one side of the housing and having a clean liquid outlet at the top of the housing, together with a tube positioned centrally of the housing and having a plurality of hollow generally flat and parallel filter leaves mounted in vertically spaced relation on said tube and closely embracing said tube, there being communication provided between the hollows of the filter leaves and the hollow portion of the tube. Our invention comprises the formation of a nozzle at the dirty liquid inlet directed across a plurality of the filter leaves and the velocity of the incoming liquid and the other parts being so arranged that a number of the leaves are kept reasonably clean for a long period of time.

A further object of the present invention is to provide in the combination of the preceding paragraph filter leaves having very smooth surfaces so as to more advantageously cooperate with the incoming jet of liquid to keep the leaves clean.

A still further object of the invention is to provide such an arrangement of the parts and such a velocity of the incoming liquid as to produce superior cleaning results on the filter leaves.

The filter leaves utilized in our invention may be of various sorts but particular arrangements of leaves are set forth which provide a superior result.

Other objects and advantages of the present invention will be apparent from the accompanying drawings and description and the essential features will be set forth in the appended claims.

In the drawings,

Fig. 1 is a top plan view of a liquid filter embodying our invention;

Fig. 2 is a transverse sectional of the same taken along the line 2—2 of Fig. 1;

Fig. 4 is a fragmental sectional view of a modification, this modification being substitutable in Fig. 2 of the drawings; while

Figure 3:
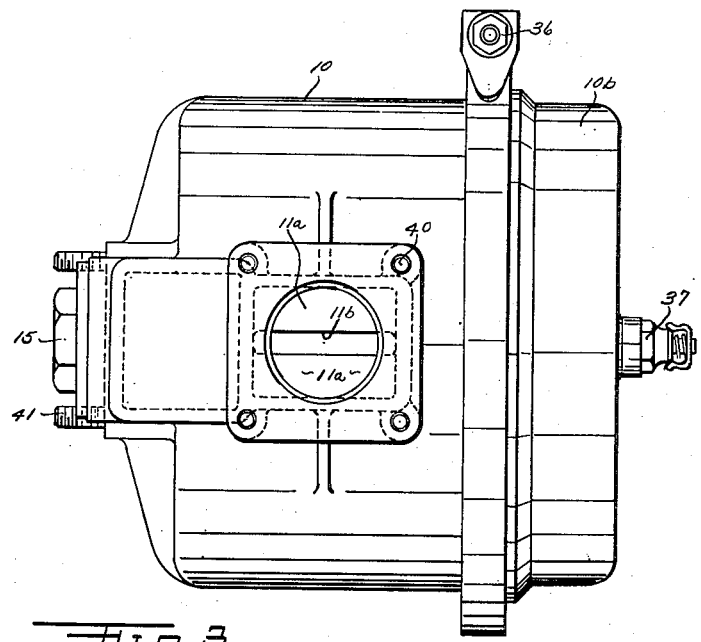
Fig. 3 is a side elevational view of the same taken generally along the line 3—3 of Fig. 1.

Our invention is shown as embodied in a housing 10 comprising an upper portion 10a housing the filter proper and a lower sump portion 10b secured thereto. The housing portion 10a has a dirty liquid inlet at an intermediate portion of one of the side walls thereof as indicated at 11. A clean liquid outlet is provided in the top wall of the housing as indicated at 12. Preferably, for safety reasons, a by-pass is provided between the inlet 11 and the outlet 12 controlled by a safety check valve or by-pass valve 14. This is for the purpose of permitting liquid to flow from 11 to 12 in case the filter becomes almost entirely plugged. This is necessary where the filter is installed in a fuel line to an engine where a supply of fuel is absolutely necessary even though it may be dirty under emergency conditions.

The valve 14 has a head 14a which normally closes a corresponding opening in a partition wall of the housing. It also has a stem 14b which is slidably mounted in a cap 15 which is screwed into a suitable opening in the housing. A spring 16 normally urges the by-pass valve to a closed position which is opened only in emergencies. This invention is not directed toward this by-pass construction.

The main portion of the filter comprises a central hollow tube 17 which is provided with a large number of relatively small perforations 17a over substantially the entire area of the tube. The upper end of the tube is permanently fixed in a collar 18 which in turn is threaded into an opening 12a in the partition of the housing which defines the by-pass 13. The opening 12a is concentric with and directly opposite the opening 12. The lower end of the tube is permanently closed by means of a downwardly opening cup-shape cap 19 welded or otherwise permanently secured to the tube 17. A hollow bolt 20 is welded to the plate 19 at the central portion thereof and extends downwardly therefrom. Threaded on this bolt is nut 21 which bears against a downwardly opening cup-shape member 22 which has a reversely curved flange portion 22a which is concentric with and fits snugly against the outside wall of the tube 17 at the lower end thereof for the purpose of holding in place a plurality of filter leaves 23 after they are assembled upon the tube. It will be noted that when the nut 21 is drawn up on the bolt 20 it presses the flange 22a against the lowermost filter leaf 23 and all of the leaves are then held tightly against the upper collar 18.

Figure 4:
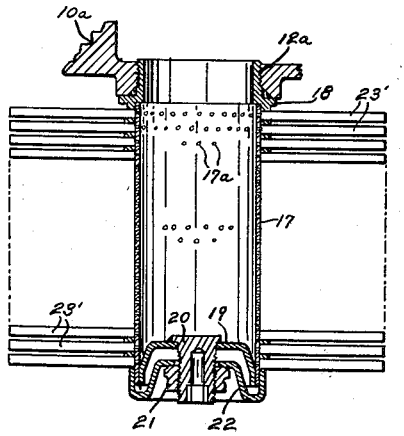

The filter leaves 23 of Fig. 2 or 23' of Fig. 4 are of hollow construction having upper and lower annular filtering surfaces having very fine openings so as to remove very fine particles from the liquid entering at 11. In either case, the top and bottom surfaces of each leaf 23 or 23' are quite smooth so that dirt particles are easily washed off of these surfaces. It will be readily understood that if these surfaces were rough, it would be very difficult to wash the dirt particles away in a manner as hereinafter taught. A preferred material for forming the upper and lower annular surfaces of each of the filter leaves 23 and 23' is disclosed and claimed in United States Patent 2,423,547 granted July 8, 1947 to Robert A. Behlen, to which reference may be had for a more complete description of a sheet of material which has a very smooth surface and yet which provides a very large number of very small openings for filtering purposes.

Figure 5:
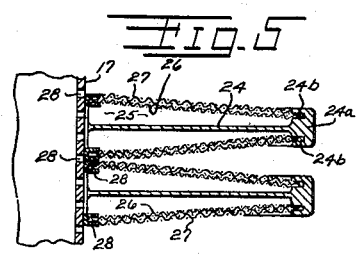
Fig. 5 is an enlarged fragmental sectional view through one of the filter leaves of Fig. 2.

The filter leaves 23' of Fig. 4 may be formed exactly as described in the above-mentioned Behlen patent. The filter leaves of Fig. 2 are of a slightly preferred form wherein the leaves taper from the central portion out to their peripheral edges. A suitable construction for these leaves is shown in Fig. 5. An annular separator disk 24 is provided with a plurality of radially extending ribs 25 extending upwardly and downwardly from the central portion of the disk 24. Lying on the ribs 25 are an inner coarse wire mesh annular sheet 26 over which is a sheet 27 of the calendered wire screen mesh material flattened as taught in the above-mentioned Behlen patent. The upper pair of screens 26 and 27 are bound at their inner edges by an annular C-shaped ring 28. The lower pair of screens 26 and 27 are bound in a like manner with another ring 28. At the periphery of each filter leaf, the disk 24 is provided with an outer ring 24a in which are provided pockets 24b which may be pressed down against the screens 26 and 27 so as to hold the same firmly mounted in the position shown in Fig. 5. The disk 24 with its ribs 25 is analogous to and of the same general construction as the disk 18 with its ribs 19 in United States Patent No. 2,444,147 granted June 29, 1948 to George M. Walton. The construction shown in the above-mentioned Walton patent as modified in Fig. 5 of this application, provides a filter leaf which has radially extending passages between the adjacent ribs 25 which passages increase in depth from the periphery of the filter leaf toward the center thereof. This gives the tapered filter leaf shown in Fig. 2 and permits a better washing of the dirt from the surfaces of the calendered screen mesh material 27 in the manner hereinafter taught.

In order to keep the dirt material from building up so rapidly on the filter leaves, a plurality of such filter leaves are placed opposite the inlet 11 and the side walls 11a, as shown in Figs. 1 and 3, are caused to converge inwardly so as to form a narrow but vertically elongated nozzle 11b. This nozzle terminates in a zone very close to the filter leaves 23. In a preferred form of our invention intended to filter liquids of the character of kerosene, gasoline or naphtha, the preferred velocity of the liquid entering through the nozzle 11b is between 600 and 900 feet per minute for giving the best cleaning results. Below 600 feet per minute, the dirt collected too rapidly upon the filter leaves 23. Above the 900 feet per minute velocity, there was a pitting or erosion action of the liquid against the surfaces of the filter leaves 23.

For best results, I prefer to provide a relatively quiescent zone 29 as clearly shown in Fig. 1 on that side of the filter leaves opposite the inlet 11. It will be noted in Fig. 1, that the inside wall of the housing portion 10a is cylindrical and the general conformation of the peripheries of all of the filter leaves 23 is also generally cylindrical. The tube 17 is placed eccentric to the cylindrical wall of the housing 10a so as to leave the space 29 at the side of the filter leaves farthest from the inlet. This zone is sufficiently quiescent that dirt may settle downwardly in this portion of the housing 10a.

Preferably, but not necessarily, we provide one or more vertically extending ribs 30, two being shown, extending radially inwardly from the wall of the housing 10a to a zone fairly close to the filter leaves 23. These ribs 30 tend to stop circular movement of the liquid in the chamber 29 and act as downwardly guiding vanes to direct the dirt downwardly into the sump portion 10b.

The sump portion 10b is provided by means of an upwardly opening cup-shape member having a top ring 31 welded to its rim. This ring has an outwardly turned flange 31a which bears against a radially outwardly extending flange 10c on the upper housing portion 10a. Preferably, an O-ring of rubber-like material is provided at 32 between the flanges 31a and 10c so as to seal the joint at this point. The flanges 31a and 10c are held clamped to each other by means of a split ring 33 generally U-shape in form, opening inwardly and having flanges which diverge inwardly. To one end of the ring is pivotally secured a bolt 34 which passes through a suitable fixture 35 on the other end of the ring and a nut 36 holds the parts tightly clamped together as shown in Fig. 1. The bottom of the sump is provided with a drain plug 37.

Between the housing portion 10a and the sump 10b is provided a foraminous partition 38. This partition is below the lowermost filter leaf 23 but not very far below that leaf. The partition is here shown as held in the sump member 10b although it will be understood that it could be permanently attached to the tube structure 17. The openings in the partition 38 are sufficiently large to permit dirt to fall downwardly into the sump but sufficiently fine to prevent the turbulence of the liquid in the housing portion 10a being effective in the sump portion 10b to stir up the dirt in the sump in any substantial amount. A preferred construction of the partition 38 is a sheet of standard wire mesh screen having 30 meshes per inch in two dimensions at right angles to each other. A still better partition in some cases is provided by means of two of these 30 x 30 mesh screens flat against each other in the place of the partition 38 shown in Fig. 2.

It should be understood from what was said previously, that all of the parts of Fig. 4 are intended to be like Fig. 2 except the specific construction of the filter leaves 23'. The parts of Fig. 4 have therefore been given the same reference characters where they represent the same parts as Fig. 2.

To obtain the best results, there should be at least two of the filter leaves 23 or 23' above the level of the top of the nozzle 11b and at least three of the filter leaves below the level of the bottom of the nozzle 11b. These leaves above and below the nozzle 11b and outside of the primary jet washing action of the liquid entering through the inlet 11, seem to be necessary for the most efficient operation of our invention. We regard these leaves not subject to jet washing action as storage leaves for dirt or possibly necessary to the best removal of all sizes of dirt particles from the dirty liquid entering the filter. One theory is that the larger dirt particles are very quickly filtered out in the passage of the dirty liquid across the leaves immediately opposite the inlet opening 11 and these dirty particles, being immediately separated, by filter action, pass to the zone 29 and downwardly into the sump. The smaller particles sometimes do not have time to separate in the quick trip of the jet across the filter leaves and these smaller particles find time to filter out in the leaves above and below the jet washing action of the liquid from the nozzle 11b. Whether this theory be right or wrong, we find that the filter is not efficient without these storage leaves above and below the jet washing action of the nozzle 11b.

It will be understood that the studs 39 serve to mount the device on a supporting surface; the studs 40 serve for the attachment of an inlet pipe, and the studs 41 serve for the attachment of an outlet pipe.

What we claim is:

1. In a liquid filter for kerosene, gasoline and naphtha, a housing having a dirty liquid inlet at one side and having a clean liquid outlet at the top, a tube positioned vertically in said housing and spaced from said inlet, said tube being closed at the bottom and open at the top in communication with said outlet, a plurality of hollow generally flat and parallel filter leaves mounted on said tube with at least the peripheries of said leaves in vertically spaced relation, the generally horizontally extending surfaces of said leaves being smooth, said leaves closely embracing said tube, there being perforations in said tube communicating only with the hollows of said leaves where the latter embrace said tube, said leaves extending to a zone close to said inlet on one side, said tube being eccentrically positioned within said housing providing a greater space between said leaves and said housing on the side opposite said inlet thereby providing a relatively quiescent zone, at least one vertical rib in said relatively quiescent zone extending from said housing inwardly to a zone near said leaves and from approximately the level of the uppermost of said leaves down to a point below the lowermost of said leaves, an elongated vertically extending nozzle in said inlet close to the edge of said leaves, a large portion of filter leaves lying horizontally opposite said nozzle, and there being at least two filter leaves above the level of the top of said nozzle and at least three filter leaves below the level of the bottom of said nozzle.

2. In a liquid filter, a housing having a dirty liquid inlet at one side and having a clean liquid outlet, a tube positioned vertically in said housing and spaced from said inlet, said tube being in communication with said outlet, a plurality of hollow generally flat and parallel filter leaves mounted in vertically spaced relation on said tube and closely embracing said tube, there being perforations in said tube communicating only with the hollows of said leaves where the latter embraces said tube, said leaves extending radially to a zone close to said inlet, a vertically elongated nozzle in said inlet, a plurality of said filter leaves being positioned opposite said nozzle, said tube being eccentrically positioned within said housing so as to position said filter leaves nearer said inlet and providing a space in said housing on the side of said leaves away from said inlet greater in horizontal dimension than that on the side of said leaves toward said inlet, whereby to provide a relatively quiescent zone in said greater space for dirt carried across said leaves by jet action of said nozzle to fall downwardly.

3. The combination of claim 2 including at least one vertical rib in said greater space, said rib extending from said housing radially inwardly to a zone near said leaves.

4. The combination of claim 3 wherein said rib extends uninterruptedly from substantially the uppermost of said leaves to a point below the lowermost of said leaves.

References Cited in the file of this patent

UNITED STATES PATENTS

| 202,471 | Rogers | Apr. 16, 1878 |
| 743,091 | Loop | Nov. 3, 1903 |
| 1,468,906 | Inman | Sept. 25, 1923 |
| 1,609,856 | Blackman | Dec. 7, 1926 |
| 1,780,663 | Winslow et al. | Nov. 4, 1930 |
| 1,989,795 | Fellows | Feb. 5, 1935 |
| 2,078,524 | Ashton et al. | Apr. 27, 1937 |
| 2,423,547 | Behlen | July 8, 1947 |
| 2,444,147 | Walton | June 29, 1948 |
| 2,556,521 | Chase | June 12, 1951 |

FOREIGN PATENTS

| 843,730 | France | Apr. 3, 1939 |